US010142869B2

(12) United States Patent
Llosa et al.

(10) Patent No.: US 10,142,869 B2
(45) Date of Patent: Nov. 27, 2018

(54) ESTIMATION OF WIRELESS SIGNAL STRENGTH AT A DISTANCE FROM DISTRIBUTED SURVEY (71) Applicant: SR Technologies, Inc., Davie, FL (US)

(72) Inventors: Guillermo Llosa, Davie, FL (US); Graham K. Smith, Boca Raton, FL (US)

(73) Assignee: SR Technologies, Inc., Davie, FL (US)

(*) Notice: Subject to any disclaimer, the term of this patent is extended or adjusted under 35 U.S.C. 154(b) by 227 days.

(21) Appl. No.: 15/042,861

(22) Filed: Feb. 12, 2016

(65) Prior Publication Data
US 2016/0242192 A1 Aug. 18, 2016

Related U.S. Application Data (60) Provisional application No. 62/117,167, filed on Feb. 17, 2015.

(51) Int. Cl.
H04W 24/08 (2009.01)
H04W 16/18 (2009.01)

(52) U.S. Cl.
CPC .......... H04W 24/08 (2013.01); H04W 16/18 (2013.01)

(58) Field of Classification Search
CPC ................ H04W 24/08; H04W 16/08
See application file for complete search history.

(56) References Cited

U.S. PATENT DOCUMENTS

| 2004/0180671 A1* | 9/2004 | Spain, Jr. ............. H04W 64/00 455/456.1 |
| 2005/0032520 A1* | 2/2005 | Muller ................. H04B 17/327 455/448 |
| 2013/0321424 A1* | 12/2013 | Pylappan ............... G06T 11/00 345/440 |

* cited by examiner

Primary Examiner — Marcus Hammonds
(74) Attorney, Agent, or Firm — Christopher & Weisberg, P.A (57) ABSTRACT A method and wireless communication device for estimating wireless signal strength value of a wireless signal transmission for an unpopulated cell in an array corresponding to a geographic area. The method includes populating at least one cell along a route within the array with a corresponding received wireless signal strength value, selecting a number of populated cells within a predetermined distance of the unpopulated cell, identifying one of the number of populated cells within a predetermined distance of the unpopulated cell, determining a maximum wireless signal strength value from among the received wireless signal strength values, estimating a first wireless signal strength value for the unpopulated cell based at least on a wireless strength value for the identified one of the number of populated cells and the maximum wireless signal strength value, and storing the first estimated wireless signal strength value.

15 Claims, 7 Drawing Sheets

ESTIMATION OF WIRELESS SIGNAL STRENGTH AT A DISTANCE FROM DISTRIBUTED SURVEY

CROSS-REFERENCE TO RELATED APPLICATION

This application is related to and claims priority to U.S. Provisional Patent Application Ser. No. 62/117,167, filed Feb. 17, 2015, entitled "ESTIMATION OF WIRELESS SIGNAL STRENGTH AT A DISTANCE FROM DISTRIBUTED SURVEY", the entirety of which is incorporated herein by reference.

STATEMENT REGARDING FEDERALLY SPONSORED RESEARCH OR DEVELOPMENT n/a

TECHNICAL FIELD

The present disclosure relates to a method and system for wireless communications, and in particular to a method and system for wireless signal strength determination.

BACKGROUND

When carrying out a brief wireless survey, possibly consisting of just a few readings, it is often desired that the monitoring operator be able to obtain a comprehensive area signal strength map of the received signal strengths from a particular wireless emitter over the entire target area of interest in a short time. In addition to the short available time within which to carry out the survey, certain terrain features may prevent the operator from measuring the signal strength at optimal positions in order to estimate the total area coverage and variations in signal strength. Features such as roads, bridges, buildings, private property, and terrain features such as lakes, rivers, hills, may restrict the operator from performing data collection in many locations. In the case where the collecting operator needs to know a complete profile of the target emitter's range and strength in a short time and with a restricted number of measurement points, it is desirable to produce a signal strength map of the entire area of interest that has been derived from a few measured points.

Many propagation loss formulas exist for the estimation of the wireless power level and given the transmitted power of the radio signal and the distance from the emitter to a specific location, it is possible to estimate the strength of the radio signal at that location. However, this estimate of the radio signal strength is affected by additional losses due to terrain features, obstructions, and multipath fading, all which may not be known. Additionally, in many cases, the accurate emitted strength of the radio signal and its precise location may not be known.

One case is where a user is interested in the various signal strengths from a particular emitter across an entire area. In order to plot the signal strengths the user can move within that area and measure the received signal strength at various locations. For example, the user may drive an automotive vehicle within the area, recording the signal strength periodically. When moving or considering moving to a particular location, the operator may wish to know, in advance, the expected signal strength of a particular wireless transmitter at that location such that the received signal strength is at a level that enables efficient monitoring. Current systems do not provide this information. In addition, displays do not provide information for an emitter for which the accurate location and emitter power may not be known. One example is when the wireless system to be monitored is based upon the IEEE 802.11 standards, commonly known as Wi-Fi, and the transmissions to be monitored are from a particular access point or station.

SUMMARY

The present disclosure advantageously provides a method and system for estimating the wireless signal strength of a wireless signal transmission for an unpopulated cell along a route. In one aspect of the disclosure, a method of estimating a wireless signal strength value of a wireless signal transmission for an unpopulated cell in an array corresponding to a geographic area is provided. The method includes populating at least one cell along a route within the array with a corresponding received wireless signal strength value. selecting a number of populated cells within a predetermined distance of the unpopulated cell, identifying one of the number of populated cells within the predetermined distance of the unpopulated cell, determining a maximum wireless signal strength value (MAX STRENGTH) from among the received wireless signal strength values, estimating a first wireless signal strength value for the unpopulated cell based at least on a wireless strength value for the identified one of the number of populated cells and the MAX STRENGTH, and storing the estimated first wireless signal strength value for the unpopulated cell in the array.

In another aspect of the disclosure, a wireless communication device configured to estimate a wireless signal strength value of a wireless signal transmission for an unpopulated cell in an array corresponding to a geographic area is provided. The device includes an interface configured to receive wireless signal strength values, and processing circuitry including a memory and a processor, the memory in communication with the processor, the memory having instructions that, when executed by the processor, configure the processor to populate at least one cell along a route within the array with a corresponding received wireless signal strength value, select a number of populated cells within a predetermined distance of the unpopulated cell, identify one of the number of populated cells within a predetermined distance of the unpopulated cell, determine a maximum wireless signal strength value (MAX STRENGTH) from among the received wireless signal strength values, and estimate a first wireless signal strength value for the unpopulated cell based on a wireless strength value for the identified one of the number of populated cells and the MAX STRENGTH.

In yet another aspect of the disclosure, a wireless communication device configured to estimate a wireless signal strength value of a wireless signal transmission for an unpopulated cell in an array corresponding to a geographic area is provided. The device includes an interface configured to receive wireless signal strength values, and processing circuitry including a memory and a processor, the memory in communication with the processor, the memory having instructions that, when executed by the processor, configure the processor to populate at least one cell along a route within the array with a corresponding the received wireless signal strength value, select a number of populated cells within a predetermined distance of the unpopulated cell, identify one of the number of populated cells within a predetermined distance of the unpopulated cell, determine a maximum wireless signal strength value (MAX STRENGTH) from among the received wireless signal strength values, determine a maximum range value (MAX RANGE) represented by a largest distance between two populated cells, determine a distance (d) between the unpopulated cell and the identified one of the number of populated cells, determine a distance (D) between the identified one of the number of populated cells and a hypothetical location, the hypothetical location proximate a source of the wireless transmission, wherein the MAX STRENGTH and MAX RANGE are used to calculate the distance D, and estimate a first wireless signal strength value for the unpopulated cell based upon a wireless strength value for the identified one of the number of populated cells, the distance (d) between the unpopulated cell and the identified one of the number of populated cells, the MAX STRENGTH, and the distance (D) between the identified one of the number of populated cells and the hypothetical location.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
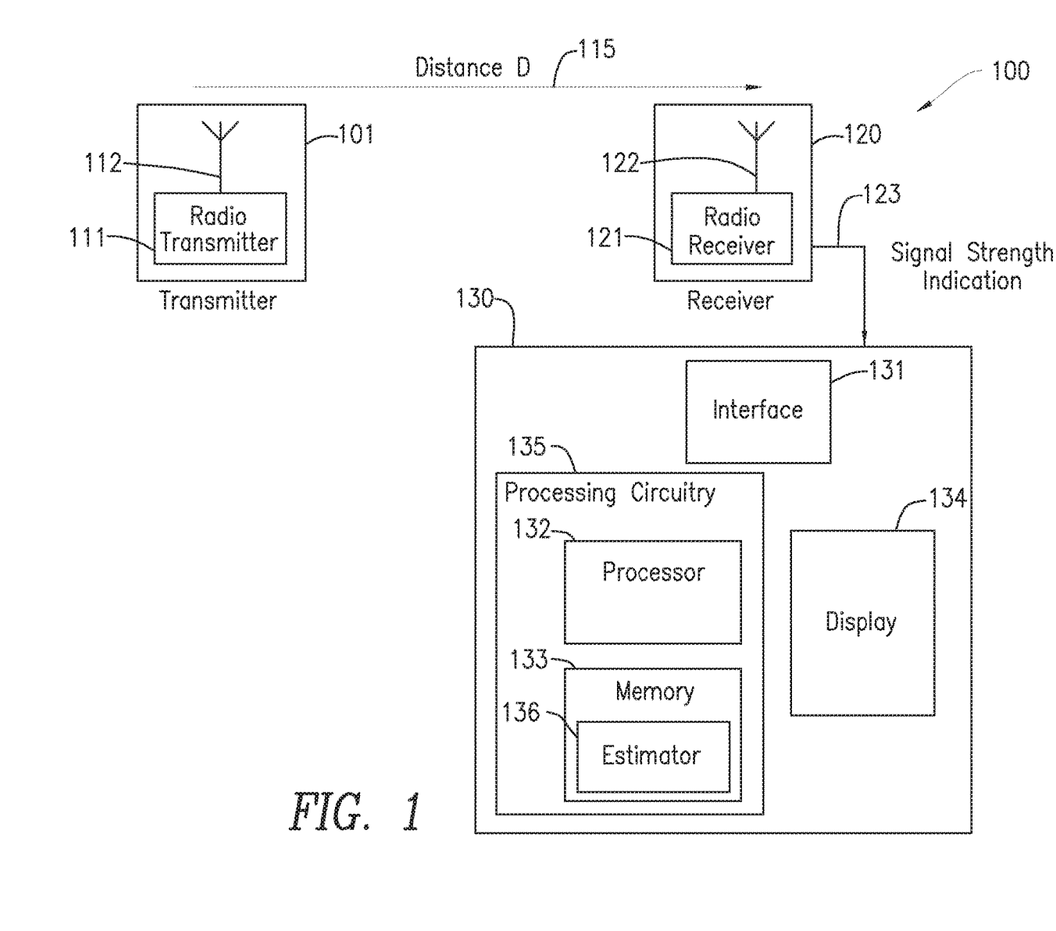
FIG. 1 is a block schematic diagram of a transmitter and receiver.

A method and system are described that allow for fast estimation of the signal strength throughput in an area based upon a small set of measured points and where the location and transmitted power of the source may not be known Referring now to the drawing figures in which like reference designators refer to like elements, there is shown in FIG. 1 an example system 100 constructed in accordance with the principles of the present disclosure. As show in the block diagram of FIG. 1, the system 100 includes a wireless transmitter 101 and a wireless receiver 120, separated by a distance, D, 115. The transmitter 101 includes a radio transmitter 111 and an antenna 112. The radio transmitter 111 produces a wireless signal that is radiated via the antenna 112. The receiver 120 has an antenna 122 and a radio receiver 121. Although not shown, it is understood that the receiver 120 also includes a processor and memory to carry out the functions described herein with respect to the receiver 120.

The signal radiated from antenna 112 is attenuated due to the distance D, 115, and is picked up at antenna 122 and applied to the radio receiver 121 where it is detected and may be demodulated. The signal strength of the received signal is provided by the signal strength indicator signal 123 which is outputted from the radio receiver 121 and received by the computer system 130. The computer system 130 has a communication interface 131 for receiving signals from wireless receiver 120, processing circuitry 135, which includes a processor 132 a memory 133, and a display 134. Display 134 could be, for example, a computer screen depicting a graphical representation of the data of computer system 130.

In one embodiment, memory 133 stores programmatic instructions that when executed by processor 132, cause computer system 130 to perform the functions described herein. Memory 133 may also store the signal strength data received from receiver 120. In addition to a traditional processor and memory, processing circuitry 135 may comprise integrated circuitry for processing and/or control, e.g., one or more processors and/or processor cores and/or FPGAs (Field Programmable Gate Array) and/or ASICs (Application Specific Integrated Circuitry). Processing circuitry 135 may comprise and/or be connected to and/or be configured for accessing (e.g., writing to and/or reading from) memory 133, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 133 may be configured to store code executable by control circuitry and/or other data, e.g., data pertaining to communication, e.g., configuration and/or address data of nodes, etc. Memory 133 includes estimator 136. As explained in further detail below, estimator 136, as executed by processor 132, is configured to estimate the wireless signal strength value for an unpopulated cell based on a wireless strength value for an identified one of a number of populated cells. The receiver system 120 and the computer system 130 may be separate devices or may be incorporated into one physical device.

The actual propagation loss of the signal emitted by the transmit antenna 112 and the signal received at antenna 122 depends upon many conditions. The simplest channel is that where there is a free space line of sight with no objects between or around the transmitting antenna 112 and the receiving antenna 122. For this case, the signal power falls off in proportion to the square of the distance D, 115. In other cases, the signal power falls off more quickly, typically 3rd or 4th power of the distance. It is possible that with detailed knowledge of the transmission path, the transmitted power level, the exact location of the transmitter, any obstructions, the heights of the antennas and the terrain topology, to accurately calculate the received signal strength at any point to a reasonable degree of accuracy. If all these details are known, it is possible to construct an accurate survey of an area and produce a predicted signal strength map of an area. This process is, however, often a long and arduous task. Methods and systems are disclosed herein, which, using the measured signal strengths at a series of locations, provide an estimation of the signal strengths over the entire area of interest.

Figure 2:
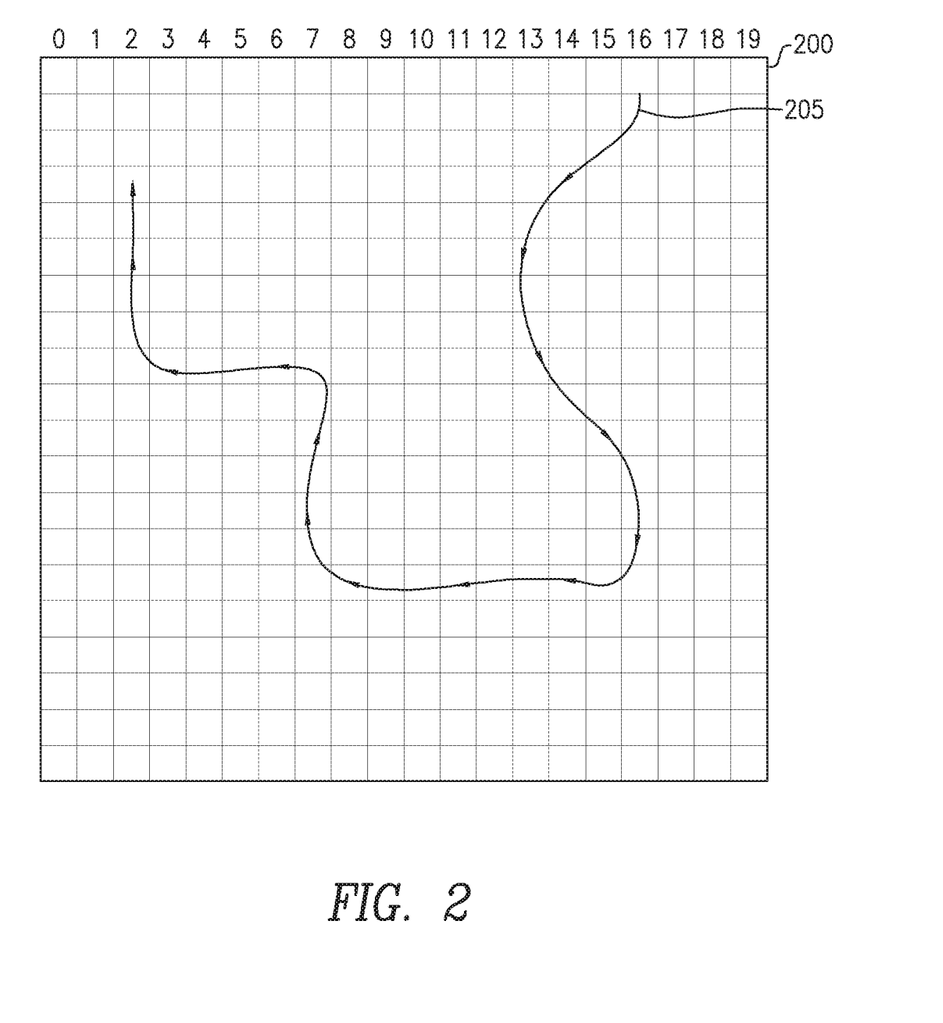
FIG. 2 is a diagram of a two dimensional area with a survey trace superimposed.

FIG. 2 is a diagram that shows an area 200, that has been divided into a two dimensional array of squares or cells. In this case a 20 by 20 array is shown for example purposes only. The overall size of the area and the individual size of the squares or cells may be varied according to the area of interest and the topology. For example, if the area is covering an urban scenario then it would likely be smaller than if the area covered a suburban or open space scenario. Similarly, the size of each cell may vary dependent upon whether the area of interest was urban, suburban or open space. Indeed, the individual sizes of the cells may vary within the array, for example in an area that covers both a city center and suburban environment, or an area covering an area of varying housing densities. Superimposed on the area grid 200 is shown an example of a survey route 205. An example of the route 205 would be that of the route travelled by an automotive vehicle equipped with a wireless receiver 120 in FIG. 1 as well as the computer system 130 in FIG. 1. As the vehicle is driven through the area 200 along the route 205, measurements of signal strength are taken periodically or by distance travelled. The corresponding cell in the two dimensional array in which the vehicle is located at the point of measurement is updated and populated with the measured signal strength value. If the received signal is below a minimum signal level of interest, then such an indication may also be recorded for that cell.

The term "populated cell" is used herein to refer to a cell which has a measured signal strength value applied to it, and the term "unpopulated cell" is used to refer to a cell which does not have a measured signal strength value applied to it. The system and method described herein allow an estimated signal strength to be applied to the unpopulated cells in addition to recording the signal strengths in the populated cells.

Figure 3:
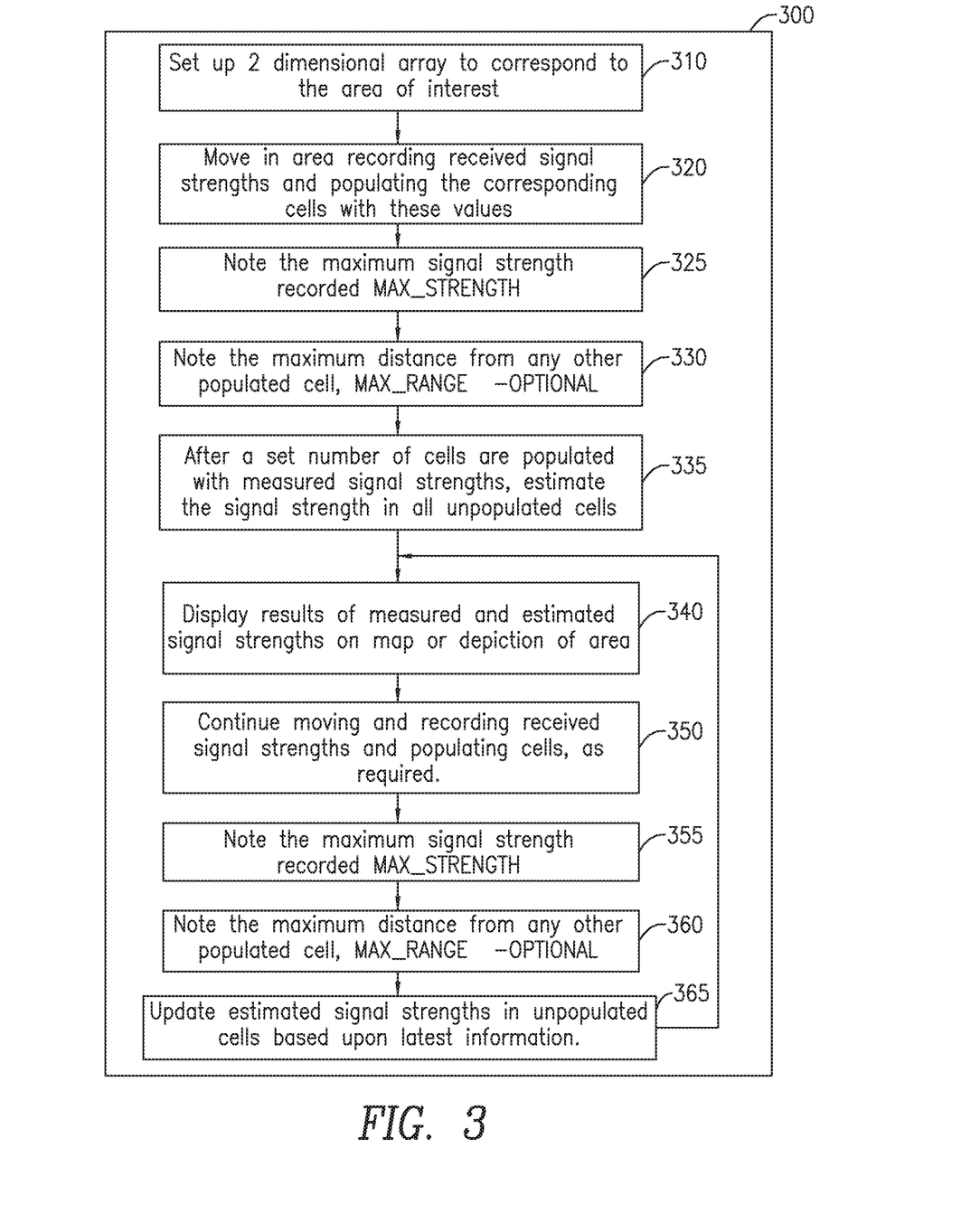
FIG. 3 is a flow chart of an exemplary process flow embodiment of the present disclosure.

FIG. 3 is a flowchart 300 of an exemplary embodiment of the present disclosure. At block 310 a two dimensional array is set up to correspond to the area of interest. This array may be established in the memory 133 of the computer system 130. In another embodiment, the array may be established in the receiver 120 for later download to the computer system 130 via the signal strength indication signal 123. In one embodiment, this array may be similar to the array 200 shown in FIG. 2. Of course, as discussed above, it is understood that the array can be of any dimension depending on the area to be covered and with cells of the same or varying sizes. The method continues with block 320 when the user moves within the area depicted by the array formed in block 310, and uses the receiver 120 and the computer system 130 to record the received signal strengths from the target transmitter in a periodic or distance travelled manner. As the signal strength readings are taken, their values are populated into the appropriate cells of the two dimensional array. In block 325 the maximum signal strength reading, MAX_STRENGTH, is saved. The value for MAX_STRENGTH is adjusted every time a new signal strength reading is noted which is greater than any noted before. In block 330, the maximum distance between any two populated cells is determined. If the distance is greater than before then this value is recorded as MAX_RANGE. This block 330 is optional and may be used when the empirical method is used for the estimation.

There are two basic methods described below for estimating the signal strength of an unpopulated cell and the use of MAX_RANGE is only used in one of them. In block 335, after a number of cells have been populated with signal strength readings, estimates of the signal strengths for all the cells in the array are then calculated. In block 340 the results of the readings and the estimates may be displayed on a map or depiction of the area using the display 134 in FIG.1. At this stage, the display of estimated signal strengths may be based upon a relatively few actual readings. The accuracy of the estimated displayed results from block 340 can be improved by taking further signal strength readings, hence, in block 350, the user may continue to move with the receiver 120 within the area, recording received signal strengths and populating the corresponding cells in the stored array either in the receiver 120 and/or in the computer system 130. Again, in block 355, the value for MAX_STRENGTH is adjusted every time a new signal strength reading is noted which is greater than any noted before. In block 360, again, optionally, the maximum distance between any two populated cells is determined. If the distance is greater than before then this value is recorded as the new MAX_RANGE. The estimates of the signal strengths in the unpopulated cells are updated in block 365. This update of the estimated values may take place for every new signal strength measurement or may be carried out after a number of new signal strength measurements are added. Blocks 340, 350, 355, 360 and 365 are then repeated as required. The more times that blocks 340, 350, 355, 360 and 365 are repeated, the better the accuracy of the estimated signal strengths in those cells that have not been populated by actual readings.

The form of the display at block 340 that is presented on the display 134 may take several forms such as a heat map where the individual contained in the array are represented as colors. For example, in a heat map display a cell where the measured or estimated signal strength is very high may be shown as one color, e.g., deep red, and a cell where the measured or estimated signal strength is very low may be shown as a different color, e.g., deep blue, with other colors used in between. Other graphical representations of the results may be used and in no way should be construed to restrict this disclosure.

Figure 4:
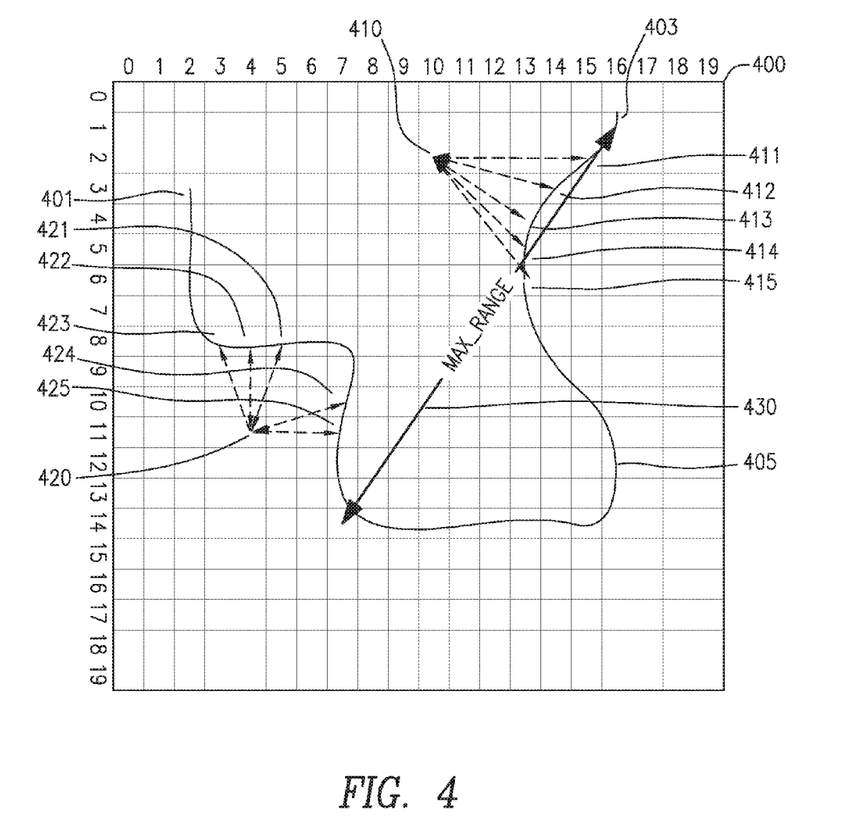
FIG. 4 is a diagram of a two dimensional area with populated and unpopulated cells.

FIG. 4 is similar to FIG. 2 in that it shows an area array 400 with an example survey route 405. The survey route shown in FIG. 4 is the same route as shown in FIG. 2. The route 405 is an example of blocks 320 and 350 in FIG. 3 where the user moves in the area 400 and measures the received signal strength periodically, populating the corresponding cells in the array with the measured signal strengths. In FIG. 4, cells 410 and 420 are examples of cells that have not been populated with measured signal strength and hence an estimated signal strength is required for each of these cells. Cells 411, 412, 413, 414 and 415 are the five closest populated cells to unpopulated cell 410. Similarly cells 421, 422, 423, 424 and 425 are the five closest populated cells to unpopulated cell 420.

As is described in more detail below, the method used to estimate the signal strength for an unpopulated cell is based upon examining the values in a number of the closest populated cells. In this example, the five closest populated cells have been used, but any fixed number or even variable number of close-by populated cells could be used. As described in FIG. 3 blocks 330 and 360, the MAX_RANGE 430 is shown for this particular example survey route 405. As the survey route 405 proceeds, starting at cell 401 and ending at cell 403, the largest distance between any two cells on the route is continuously determined and this maximum value is recorded as MAX_RANGE. In this example, this distance value will reach a maximum after the survey route 405 has passed through cell 403. Hence, in this example, once the route is complete, or once the route has passed through cell 403, MAX_RANGE value will be constant and equal to the distance between the cells 401 and 403. As the survey route 405 is travelled, the received signal strengths are recorded as described in FIG. 3 blocks 320 and 350. As well as recording the signal strength for each cell, the maximum recorded signal strength, MAX_STRENGTH, is also determined as described in FIG. 3 blocks 325 and 355. Hence, in the example depicted in FIG. 4, after the survey route 405 is completed, measured signal strength values are recorded for the cells covered in the route, and values for MAX_RANGE and MAX_STRENGTH exist.

Figure 5:
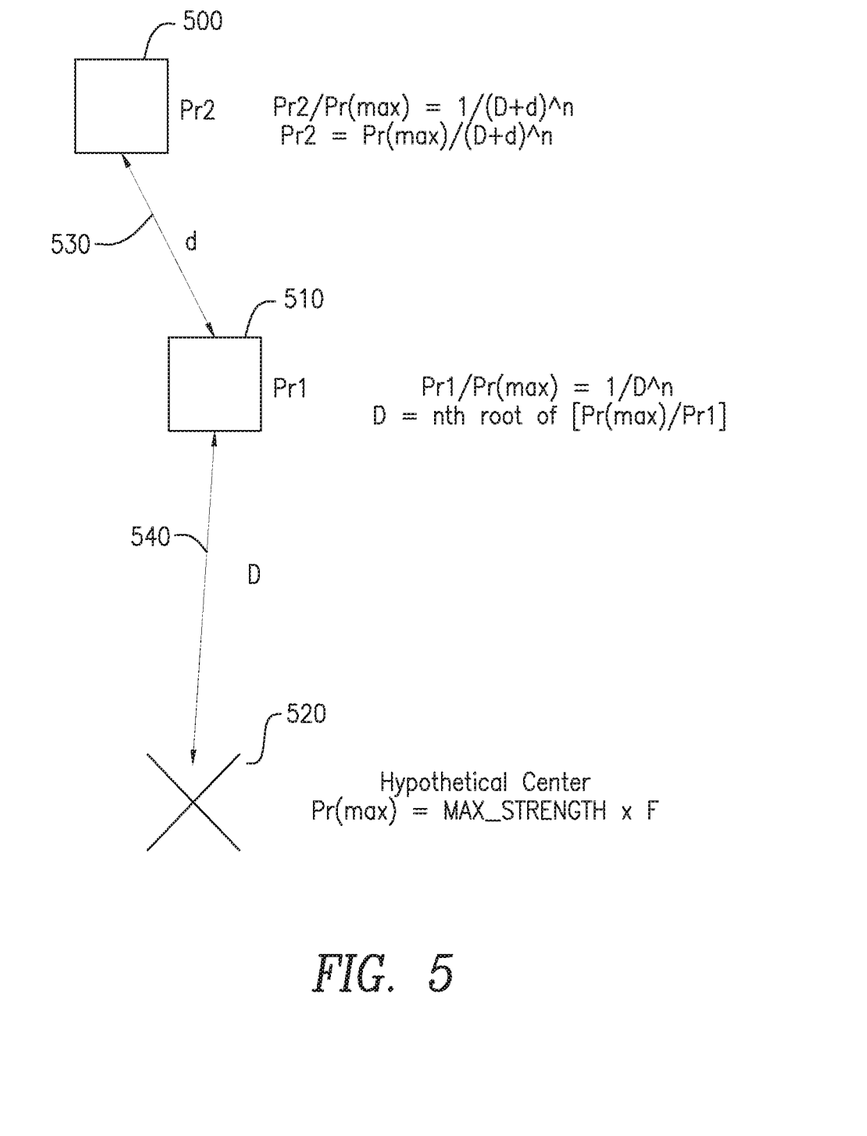
FIG. 5 is a diagram showing the estimation procedure for the signal strength of an unpopulated cell.

Two calculation methods used to estimate the signal strength in unpopulated cells are described with reference to FIG. 5. In one embodiment, the calculations are performed by the estimator 136 of processing circuitry 135 in the computer system 130 shown in FIG. 1. Cell 500 is an unpopulated cell and cell 510 is a populated cell that is close to cell 510. As described in FIG. 4, a number of the closest populated cells to a particular unpopulated cell are chosen; in this case cell 510 is one of those cells. Point 520 is a hypothetical point that is a representation of a location that is close to the source of the transmissions, i.e., within a predetermined distance of the source of transmissions. Point 520 does not actually refer to any particular cell in the array. In accordance with blocks 330 and 360 in FIG. 3, signal strength at the unpopulated cell 500 is estimated using the value of the signal strength reading in populated cell 510.

The first exemplary method for calculating the estimated signal strength of an unpopulated cell is based upon an empirical formula that has been developed from trials. At blocks 325 and 355 in FIG. 3 the maximum value of received signal strength, MAX_STRENGTH, was recorded and noted and also that at blocks 330 and 360 the maximum distance between any two populated cells, MAX_RANGE, was noted. These values of MAX_STRENGTH and MAX_RANGE are used first to calculate the distance of populated cell 510 from the hypothetical point 520.

Assuming the recorded signal strength at cell 510 is Pr1 then the hypothetical distance, D, 540, from point 520 to cell 510 is calculated as follows:

First calculate a value, C, $$C = (-MAX\_STRENGTH) / [MAX\_RANGE]^2$$

Then calculate the hypothetical distance D, $$D = \sqrt{((ABS[MAX\_RANGE]^2 . C + Pr1.F))/(ABS(C))}$$

Note that in this first method, the values for signal strength and MAX_STRENGTH are represented in units from 1, representing the lowest signal strength of interest, to 40, representing the highest signal strength of interest. For example, in the case where the transmissions are from a Wi-Fi system, then the range of values may be 1=−95 dBm, and 40=−50 dBm. Hence, in the example of a Wi-Fi system, a signal strength of −62 dBm will have a value of −95−62=33. Note also that in this first method, in the formula above for calculation D, that the signal strength at point 510, Pr1 is multiplied by a factor F. This factor F may be determined by trials or may be an assumed value. In trials, a value for factor F of 1.3 has been shown to produce good results. MAX_RANGE and distances will be measured in units of the cell size. For example, if the cells are 10 meter squares, then a distance of 2 would be 20 meters.

Assuming that the distance 530 between unpopulated cell 500 and populated cell 510 is d, an estimate for the signal strength at cell 500, Pr2, is then calculated using the following formula:

$$Pr2 = (C.[D+d]^2 - [MAX\_RANGE]^2.C)/F$$

For example, assume that MAX_STRENGTH=35 (−60 dBm), MAX_RANGE=20 (200 m), Measured Signal Strength=20 (−75 dBm), F=1.3 and d=2

Then C=−35/400=0.0875

And D=√(400*0.0875+20*1.3)/0.0875)=10.14

The estimated signal strength Pr2=(0.0875*(10.14+2)^2−400*0.0875)/1.3=17 (−78 dBm)

Using this method and the formulas explained above, the signal strength for the unpopulated cell 500 is estimated.

This first method for calculating the estimated signal strength of an unpopulated cell, as explained above, uses the MAX_RANGE value. It should be noted that for the same assumed values as the example above but with the MAX_RANGE set to 10 in place of 20, the estimated signal strength Pr2 is −81.5 dBm compared to −78 dBm. The value of MAX_RANGE will often increase as the survey proceeds and more cells are populated, but if the signal strength coverage area is small due, say, to a higher distance related propagation loss due to building density, then MAX_RANGE is also small with the result that the estimated signal strength will be lower than if MAX_RANGE was larger. The use of the MAX_RANGE factor therefore adjusts the estimated signal strength result to compensate for when the distance propagation loss may higher.

A second method for estimating the signal strength of the unpopulated cell is now explained. In this second method, the signal strength at point 520, Pr(max) is taken to be MAX_STRENGTH multiplied by the factor F. For example, if MAX_STRENGTH=−60 dBm, F=1.3, then Pr(max)=−60/1.3=−46 dBm.

Assuming the recorded signal strength at cell 510 is Pr1 and the propagation loss is proportional to the nth power of the distance, and the distance 540, from point 520 to cell 510 is D, then the following relationship exists:

$$Pr1/Pr(max) = 1/D^n$$

Hence, $D = (Pr(max)/Pr1)^{1/n}$

In dBs (10n) log $D = Pr(max) - Pr1$ where Pr(max) and Pr1 are in dBm.

$$D = 10^{((Pr(max)-Pr1)/10n)}$$

As n, Pr(max) and Pr1 are known, the value for D can be calculated.

Assuming that the distance 530 between unpopulated cell 500 and populated cell 510 is d, and then an estimate for the signal strength at cell 500, Pr2, can be calculated as follows:

$$Pr2/Pr(max) = 1/(D+d)^n$$

Or, $Pr2 = Pr(max)/(D+d)^n$

In dBs, $Pr2 = Pr(max) - 10n \log(D+d)$ where Pr(max) and Pr2 are in dBm.

As Pr(max) and D are both known, a value for Pr2 can be calculated. For example, if MAX_STRENGTH=−60 dBm, F=1.3, n=2, Pr1=−75 dBm.

$$Pr(max) = -60/1.3 = -46 \text{ dBm}$$

$$D = 10^{((-46-65)/20)} = 27.7$$

Assuming d=2, Pr2=−46−20 log (27.7+2)=−75.6 dBm

Note that D and d are both expressed in units of the dimensions of the cell size.

This value Pr2 is the estimated value for the signal strength at cell 500 based upon the populated cell 510. Pr(max) in this method is effectively used as a transmitter source representative of the actual transmitter source but at a point that is not subject to a significant obstruction loss. It is also possible to use a fixed value for Pr(max). For example, if the transmitter source is a Wi-Fi access point located within a building, the source signal strength that is of interest is that which corresponds to a point just outside of the building. This might, for example, correspond to a distance of say 10-30 feet and an obstruction loss of an outer wall of say 10 dB. In these conditions, this value could be in the area of −40 to −50 dBm and hence a value for Pr(max) equal to, say, −45 dBm could be used.

As previously described, a number of close-by populated cells can be chosen and a similar calculation as described above repeated for each selection. The final estimated value that is inserted for cell 500 may be an average of all the results, or the median, peak and/or the minimum value. Both of the described methods do not rely on any prior knowledge of the transmitter power or location. The factor F may be determined by trials or may be an assumed value. In trials, the use of the MAX_STRENGTH, MAX_RANGE and factor F of 1.3, as described for the first empirical method, has been shown to produce good results and this method has been shown to account for variations in the transmitter power and the main primary obstruction and distance losses. In the second described method, the propagation loss is proportional to the nth power of the distance and hence the value for n may vary across different scenarios. In trials, it has been found that, assuming that the power falls off in proportion to the square of the distance, n=2, produces satisfactory results, but the value of n may be varied according to the actual topology of the area in question. For example if the area is dense urban, then a higher value of n, possibly between 3 and 4, may be more appropriate.

Figure 6:
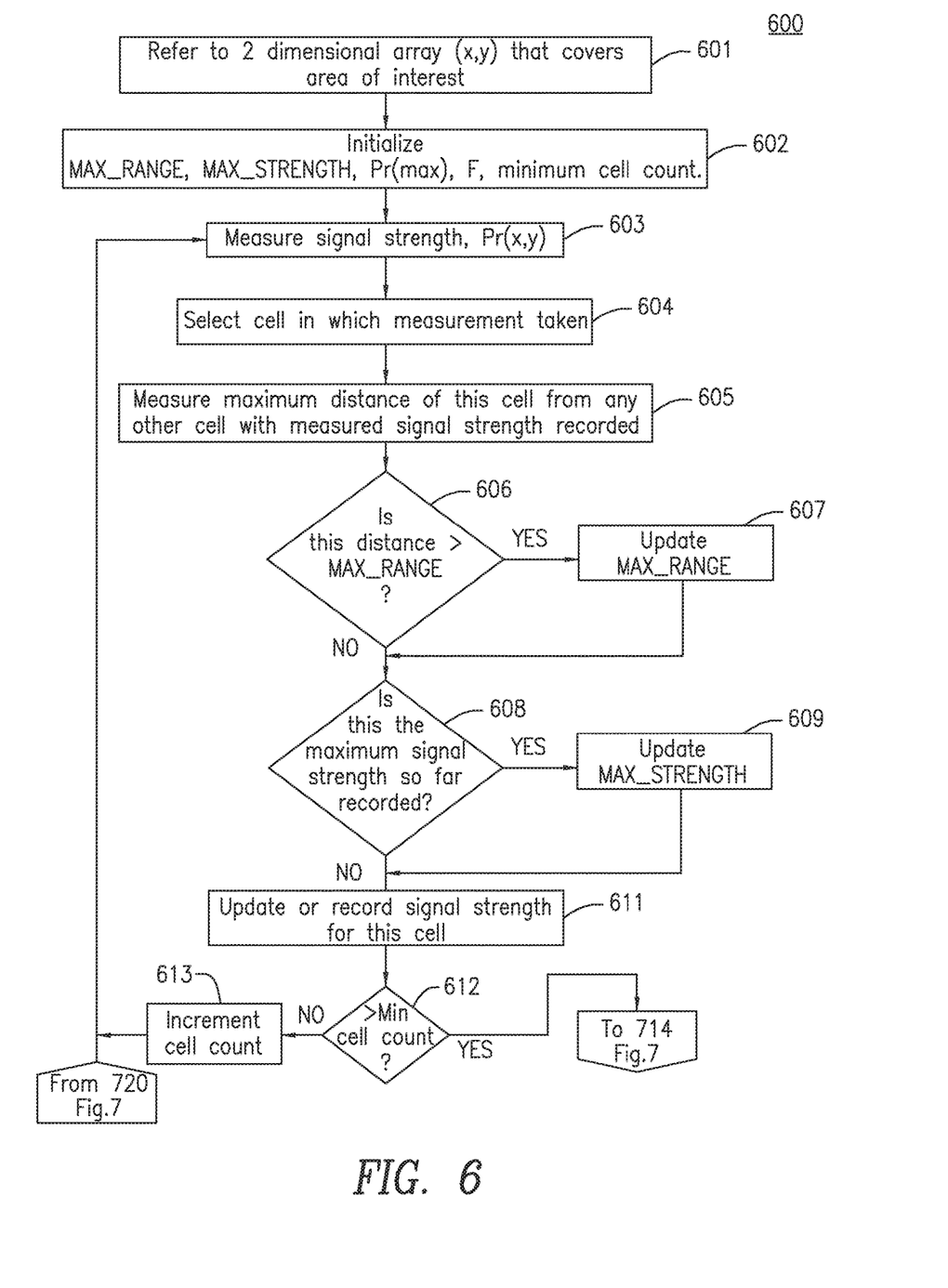
FIG. 6 is a flow chart of another exemplary embodiment of the present disclosure.
Figure 7:
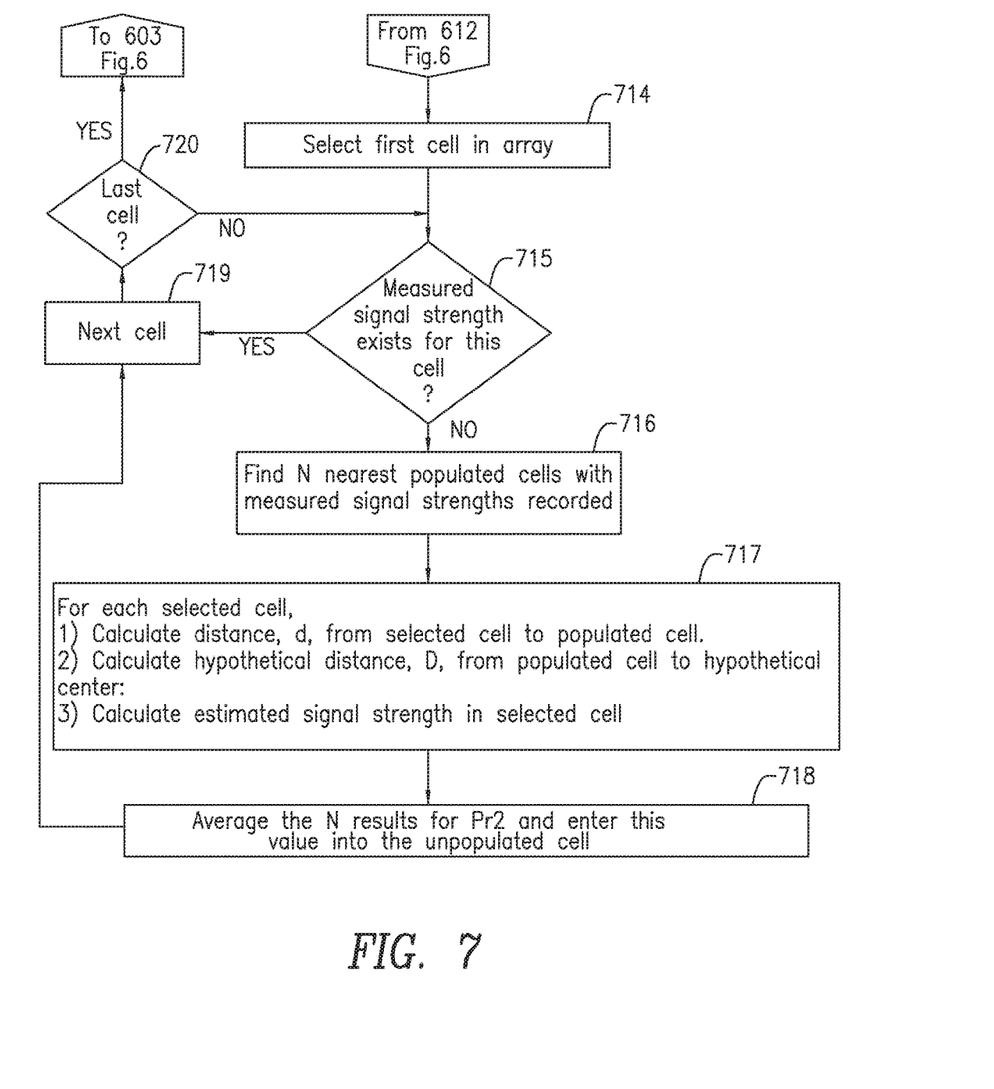
FIG. 7 is a continuation of the flow chart of FIG. 6.

FIGS. 6 and 7 are a flow charts of one embodiment 600 of the disclosure. In FIG. 6, block 601 refers to the two dimensional array that is used to cover the area of interest. In block 602 the various parameters, MAX_STRENGTH, MAX_RANGE (if used), F, and Pr(max) (if used) are initialized by processor 132. In block 603, the received signal strength is measured and in block 604 this value is applied to the cell corresponding to the position of the wireless receiver that has recorded the signal, by processor 132. In block 605 the maximum distance of this cell from any previous populated cell is noted. In block 606, processor 132 determines if this distance is greater than any distance previously noted, and if it is greater, then in block 607, the value for MAX_RANGE is updated. Blocks 606 and 607 are used if the estimation calculation is to be carried out using the first method, the empirical formulas, as described in FIG. 5. In block 608 processor 132 determines if the recorded signal strength, measured in block 603 is greater than any previously recorded value, and if it is greater, then in block 609, the value for MAX_STRENGTH is updated. In block 611, the cell is either populated or, if a value already exists for this cell, updated. Depending on the size of the cell, or the routes travelled, it is possible that several signal strength readings may be taken within the same cell, hence in block 611 if previous values exist for this cell then either the latest value is used or an average, median, minimum, maximum or other aggregation of the values may be used. At block 612 a check is made to see if the minimum numbers of cells have been populated before attempting to estimate the overall area signal strengths. This minimum populated cell count is simply a method to wait until sufficient populated cells are available to have confidence that a reasonable accuracy for the unpopulated cells will result. This count may vary depending upon the period of the readings, the speed of the survey vehicle and the area coverage, or may be dispensed with altogether. If the number of populated cells does not exceed the minimum count, then in block 613, the count is incremented and the flow returns to block 603.

In FIG. 7, blocks 714 to 720 perform the calculations to record an estimated signal strength value into each of the unpopulated cells. These steps may be performed by processor 132. In block 714, the first cell in the array is selected. Block 715 checks if a measured value already exists for this cell, and if it does, the next cell is selected in block 719. A check is made in block 720 if this is the last cell in the array and if it is, the flow returns to block 603 in FIG. 6. If not, then the flow returns to block 715. If the selected cell is unpopulated then in block 716 the N (this could be any number) closest populated cells are determined. In block 717, for each of the N closest populated cells, the following calculations are carried out:

Calculate distance, d, from selected unpopulated cell to populated cell.

Calculate distance, D, from populated cell to hypothetical center.

Calculate estimated signal strength in selected cell.

These calculations were discussed above with respect to FIG. 5 where two different methods were described.

Once the results for the estimated signal strengths have been calculated for each of the closest five populated cells, in block 718 the average of the N results may be calculated and the result is then used as the estimated signal strength for that unpopulated cell. In block 718 an alternative would be to use the minimum value, the median value or even the maximum or minimum value, or some combination of these techniques. In block 719 the next cell in the array is selected and in block 720 this is checked to see if it is the last cell in the array. If so, the flow returns to block 603 in FIG. 6 and if not the flow returns to block 715.

As the user moves throughout the area measuring signal strengths and populating more cells in the array, the estimated values of the unpopulated cells can be updated as described in FIG. 6 and FIG. 7. The updated estimates may take place for each new measurement or after a set number of new measurements or the updated estimates can be made for just those unpopulated cells that are in the vicinity of cells where the new measurements have been taken.

The results of the calculations and measurements may be displayed on the display 134 as described with reference to FIG. 1. In one embodiment, a heat map depiction of the signal strengths is used.

Thus, in one embodiment of the present disclosure, a method of estimating a wireless signal strength value of a wireless signal transmission for an unpopulated cell in an array corresponding to a geographic area. The method includes populating at least one cell along a route within the array with a corresponding received wireless signal strength value, selecting a number of populated cells within a predetermined distance of the unpopulated cell, identifying one of the number of populated cells within the predetermined distance of the unpopulated cell, determining a maximum wireless signal strength value (MAX STRENGTH) from among the received wireless signal strength values, estimating a first wireless signal strength value for the unpopulated cell based at least on a wireless strength value for the identified one of the number of populated cells and the MAX STRENGTH, and storing the estimated first wireless signal strength value for the unpopulated cell in the array.

In another embodiment of the present disclosure, a wireless communication device configured to estimate a wireless signal strength value of a wireless signal transmission for an unpopulated cell in an array corresponding to a geographic area is provided. The device includes an interface configured to receive wireless signal strength values, and processing circuitry including a memory and a processor, the memory in communication with the processor, the memory having instructions that, when executed by the processor, configure the processor to populate at least one cell along a route within the array with a corresponding received wireless signal strength value, select a number of populated cells within a predetermined distance of the unpopulated cell, identify one of the number of populated cells within a predetermined distance of the unpopulated cell, determine a maximum wireless signal strength value (MAX STRENGTH) from among the received wireless signal strength values, and estimate a first wireless signal strength value for the unpopulated cell based on a wireless strength value for the identified one of the number of populated cells and the MAX STRENGTH.

In yet another embodiment of the present disclosure, a wireless communication device configured to estimate a wireless signal strength value of a wireless signal transmission for an unpopulated cell in an array corresponding to a geographic area is provided. The device includes an interface configured to receive wireless signal strength values, and processing circuitry including a memory and a processor, the memory in communication with the processor, the memory having instructions that, when executed by the processor, configure the processor to populate at least one cell along a route within the array with a corresponding received wireless signal strength value, select a number of populated cells within a predetermined distance of the unpopulated cell, identify one of the number of populated cells within a predetermined distance of the unpopulated cell, determine a maximum wireless signal strength value (MAX STRENGTH) from among the received wireless signal strength values, determine a maximum range value (MAX RANGE) represented by a largest distance between two populated cells, determine a distance (d) between the unpopulated cell and the identified one of the number of populated cells, determine a distance (D) between the identified one of the number of populated cells and a hypothetical location, the hypothetical location proximate a source of the wireless transmission, wherein the MAX STRENGTH and MAX RANGE are used to calculate the distance D, and estimate a first wireless signal strength value for the unpopulated cell based upon a wireless strength value for the identified one of the number of populated cells, the distance (d) between the unpopulated cell and the identified one of the number of populated cells, the MAX STRENGTH, and the distance (D) between the identified one of the number of populated cells and the hypothetical location.

While the above description contains many specifics, these should not be construed as limitations on the scope, but rather as an exemplification of several embodiments thereof. Many other variants are possible including, for examples: the propagation loss is proportional to the power of the distance and different powers may be used according to the terrain and scenario, the factor F used with the signal strength readings, a fixed value for Pr(max) may be used, the size and layout of the array may vary and also the size or sizes of the cells may vary, various forms of graphical display may be used to display the results.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method of estimating a wireless signal strength value of a wireless signal transmission for an unpopulated cell in an array corresponding to a geographic area, the method comprising:

populating, at a computer system including processing circuitry, at least one cell along a route within the array with a corresponding received wireless signal strength value based on at least one measurement by at least one wireless device;

selecting, at the computer system including processing circuitry, a number of populated cells within a predetermined distance of the unpopulated cell;

identifying, at the computer system including processing circuitry, one of the number of populated cells within the predetermined distance of the unpopulated cell;

determining, at the computer system including processing circuitry, a maximum wireless signal strength value (MAX STRENGTH) from among the received wireless signal strength values that are based on the at least one measurement by the at least one wireless device;

estimating, at the computer system including processing circuitry, a first wireless signal strength value for the unpopulated cell based at least on a wireless signal strength value for the identified one of the number of populated cells and the MAX STRENGTH;

determining, at the computer system including processing circuitry, a maximum range value (MAX RANGE) represented by a largest distance between two populated cells, the estimating of the first wireless signal strength value for the unpopulated cell being further based on the determined MAX RANGE;

determining, at the computer system including processing circuitry, a first distance between the unpopulated cell and the identified one of the number of populated cells; and determining, at the computer system including processing circuitry, a second distance between the identified one of the number of populated cells and a hypothetical location, the hypothetical location proximate a source of the wireless signal transmission, the MAX STRENGTH and MAX RANGE being used to calculate the second distance, the estimating of the first wireless signal strength value for the unpopulated cell is further based upon the first distance between the unpopulated cell and the identified one of the number of populated cells and the second distance between the identified one of the number of populated cells and the hypothetical location; and storing, at the computer system including processing circuitry, the estimated first wireless signal strength value for the unpopulated cell in the array.

2. The method of claim 1, wherein estimation of the first wireless signal strength value for the unpopulated cell occurs after a predetermined number of cells have been populated.

3. The method of claim 1, further comprising displaying at least one of the received wireless signal strength values and the estimated first wireless signal strength value for the unpopulated cell.

4. The method of claim 1, further comprising:
identifying at least one other of the number of populated cells within the predetermined distance of the unpopulated cell;

estimating a second wireless signal strength value for the unpopulated cell based at least on a wireless signal strength value for the at least one other of the number of populated cells within the predetermined distance of the unpopulated cell and the MAX STRENGTH;

averaging the estimated first wireless signal strength value and the estimated second wireless signal strength value; and storing the average of the estimated first wireless signal strength value and the estimated second wireless signal strength.

5. The method of claim 1, wherein upon receipt of a wireless signal strength value greater than the determined MAX STRENGTH, further comprising:
determining an updated MAX STRENGTH; and
updating the estimated first wireless signal strength value for the unpopulated cell based on the updated MAX STRENGTH.

6. The method of claim 1, wherein upon determination of a third distance between two populated cells greater than the largest distance, further comprising:
determining an updated MAX RANGE; and
updating the estimated first wireless signal strength value for the unpopulated cell based on the updated MAX RANGE.

7. The method of claim 1, wherein estimating the first wireless signal strength value for the unpopulated cell is determined according to: $Pr2=(C \cdot [(D+d)]^2-[(MAX\ RANGE)]^2 \cdot C)/F$, where:
$Pr2$=the estimated first wireless signal strength value for the unpopulated cell;
$C=(-MAX\ STRENGTH)/[(MAX\ RANGE)]^2$;
$D=\sqrt{((ABS([(MAX\ RANGE)]^2 \cdot C+Pr1 \cdot F))/(ABS(C)))}$, where $Pr1$=the wireless signal strength value for the identified one of the number of populated cells, and
$F$=a predetermined value of adjustment; and
$d$=a distance between the unpopulated cell and the identified one of the number of populated cells.

8. A method of estimating a wireless signal strength value of a wireless signal transmission for an unpopulated cell in an array corresponding to a geographic area, the method comprising:
populating, at a computer system including processing circuitry, at least one cell along a route within the array with a corresponding received wireless signal strength value;

selecting, at the computer system including processing circuitry, a number of populated cells within a predetermined distance of the unpopulated cell;

identifying, at the computer system including processing circuitry, one of the number of populated cells within the predetermined distance of the unpopulated cell;

determining, at the computer system including processing circuitry, a maximum wireless signal strength value (MAX STRENGTH) from among the received wireless signal strength values;

estimating, at the computer system including processing circuitry, a first wireless signal strength value for the unpopulated cell based at least on a wireless signal strength value for the identified one of the number of populated cells and the MAX STRENGTH, the estimating of the first wireless signal strength value for the unpopulated cell being determined according to: $Pr2=Pr(max)/(D+d)n$, where:
$Pr2$=the estimated first wireless signal strength for the unpopulated cell;
$Pr(max)=MAX\ STRENGTH \cdot F$, where F is a predetermined value of adjustment;
$D=(Pr(max)/Pr1)1/n$, where $Pr1$=the wireless signal strength value for the identified one of the number of populated cells, and $n$=a variable corresponding to a topology of the route; and
$d$=a distance between the unpopulated cell and the identified one of the number of populated cells; and storing, at the computer system including processing circuitry, the estimated first wireless signal strength value for the unpopulated cell in the array.

9. A wireless communication device configured to estimate a wireless signal strength value of a wireless signal transmission for an unpopulated cell in an array corresponding to a geographic area, the device comprising:
an interface configured to receive wireless signal strength values; and
processing circuitry including a memory and a processor, the memory in communication with the processor, the memory having instructions that, when executed by the processor, configure the processor to:
populate at least one cell along a route within the array with a corresponding received wireless signal strength value;
select a number of populated cells within a predetermined distance of the unpopulated cell;
identify one of the number of populated cells within the predetermined distance of the unpopulated cell;
determine a maximum wireless signal strength value (MAX STRENGTH) from among the received wireless signal strength values;
estimate a first wireless signal strength value for the unpopulated cell based on a wireless signal strength value for the identified one of the number of populated cells and the MAX STRENGTH;
determine a maximum range value (MAX RANGE) represented by a largest distance between two populated cells, the estimating of the first wireless signal strength value for the unpopulated cell being further based on the determined MAX RANGE;
determine a first distance between the unpopulated cell and the identified one of the number of populated cells; and
determine a second distance between the identified one of the number of populated cells and a hypothetical location, the hypothetical location proximate a source of the wireless transmission, wherein the MAX STRENGTH and MAX RANGE are used to calculate the distance D, estimating the first wireless signal strength value for the unpopulated cell being further based upon the first distance between the unpopulated cell and the identified one of the number of populated cells and the second distance between the identified one of the number of populated cells and the hypothetical location.

10. The wireless communication device of claim 9, wherein estimation of the first wireless signal strength value for the unpopulated cell occurs after a predetermined number of cells have been populated.

11. The wireless communication device of claim 9, further comprising a display configured to display at least one of the received wireless signal strength values and the estimated first wireless signal strength value for the unpopulated cell.

12. The wireless communication device of claim 9, wherein the processor is further configured to:
identify at least one other of the number of populated cells within the predetermined distance of the unpopulated cell;
estimate a second wireless signal strength value for the unpopulated cell based at least on a wireless signal strength value for the at least one other of the number of populated cells within the predetermined distance of the unpopulated cell and the MAX STRENGTH;
average the estimated first wireless signal strength value and the estimated second wireless signal strength value; and
store the average of the estimated first wireless signal strength value and the estimated second wireless signal strength.

13. The wireless communication device of claim 9, wherein upon receipt of a wireless signal strength value greater than the determined MAX STRENGTH, the processor is further configured to:
determine an updated MAX STRENGTH; and
update the estimated first wireless signal strength value for the unpopulated cell based on the updated MAX STRENGTH.

14. The wireless communication device of claim 9, wherein estimating the first wireless signal strength value for the unpopulated cell is determined according to: $Pr2=(C \cdot [(D+d)]^2-[(MAX\ RANGE)]^2 \cdot C)/F$, where:
$Pr2$=the estimated first wireless signal strength value for the unpopulated cell;
$C=(-MAX\ STRENGTH)/[(MAX\ RANGE)]^2$;
$D=\sqrt{((ABS([(MAX\ RANGE)]^2 \cdot C + Pr1 \cdot F))/(ABS(C)))}$, where $Pr1$,=the wireless signal strength value for the identified one of the number of populated cells, and $F$=a predetermined value of adjustment; and
$d$=a distance between the unpopulated cell and the identified one of the number of populated cells.

15. A wireless communication device configured to estimate a wireless signal strength value of a wireless signal transmission for an unpopulated cell in an array corresponding to a geographic area, the device comprising:
an interface configured to receive wireless signal strength values; and
processing circuitry including a memory and a processor, the memory in communication with the processor, the memory having instructions that, when executed by the processor, configure the processor to:
populate at least one cell along a route within the array with a corresponding received wireless signal strength value;
select a number of populated cells within a predetermined distance of the unpopulated cell;
identify one of the number of populated cells within the predetermined distance of the unpopulated cell;
determine a maximum wireless signal strength value (MAX STRENGTH) from among the received wireless signal strength values; and
estimate a first wireless signal strength value for the unpopulated cell based on a wireless signal strength value for the identified one of the number of populated cells and the MAX STRENGTH, the estimating of the first wireless signal strength value for the unpopulated cell being determined according to: $Pr2=Pr(max)/(D+d)n$, where:
$Pr2$=the estimated first wireless signal strength for the unpopulated cell;
$Pr(max)=MAX\ STRENGTH \cdot F$, where $F$ is a predetermined value of adjustment;
$D=(Pr(max)/Pr1)1/n$, where $Pr1$=the wireless signal strength value for the identified one of the number of populated cells, and $n$=a variable corresponding to a topology of the route; and
$d$=a distance between the unpopulated cell and the identified one of the number of populated cells.

* * * * *